June 2, 1959      H. I. CHAMBERS      2,889,503
FAST RESPONSE SERVOMOTOR SYSTEM ADAPTED FOR RECORDING
Filed Oct. 15, 1956      2 Sheets-Sheet 1

INVENTOR.
HERBERT I. CHAMBERS
BY
Christie, Parker & Hale
ATTORNEYS

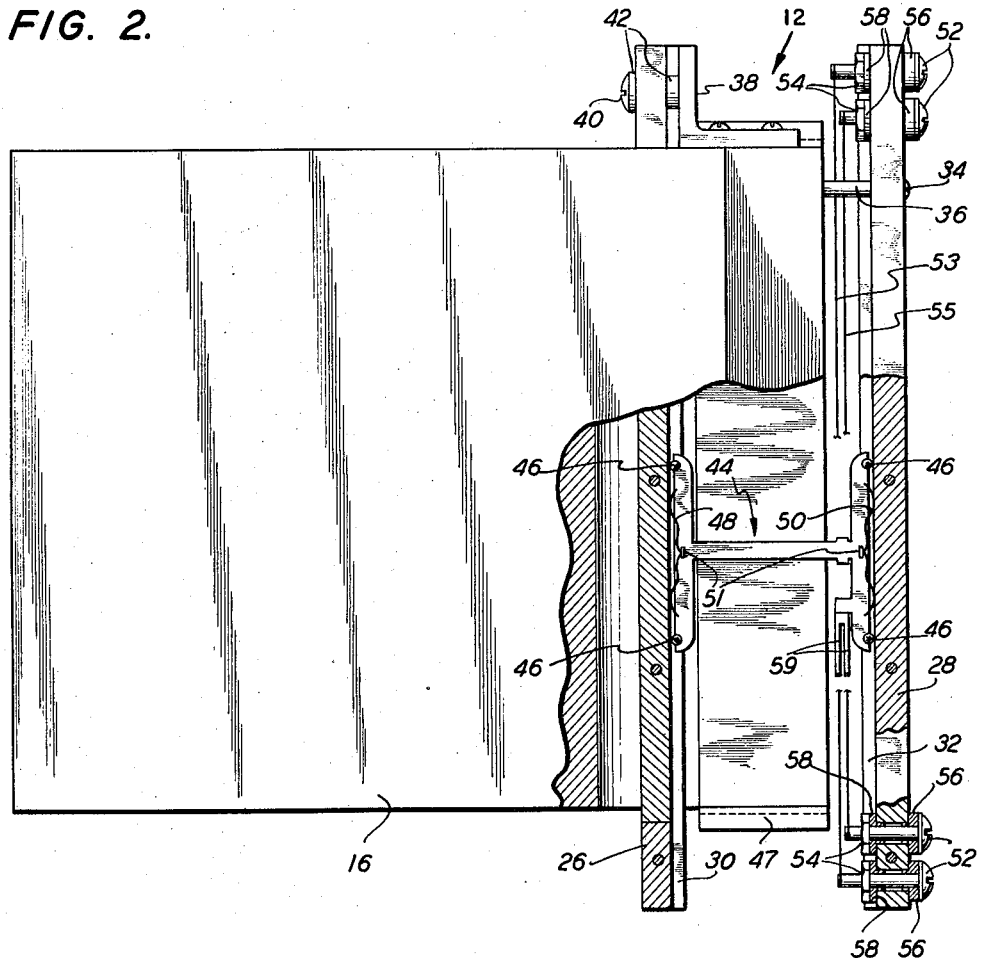

United States Patent Office 2,889,503
Patented June 2, 1959

2,889,503

FAST RESPONSE SERVOMOTOR SYSTEM ADAPTED FOR RECORDING

Herbert I. Chambers, Pasadena, Calif., assignor to Consolidated Electrodynamics Corporation, Pasadena, Calif., a corporation of California Application October 15, 1956, Serial No. 615,900

5 Claims. (Cl. 318—22)

This invention relates to oscillograph recorders and, more particularly, is concerned with a closed loop servo type recording oscillograph.

Recording oscillographs can be classified according to two types generally referred to as the closed loop type and the open loop type. The closed loop type generally involves a pen driven by a servo motor and involves some sensing means, such as a slide wire, by means of which a feed-back signal can be developed which is indicative of the position of the pin. By balancing the feed-back signal with the input signal, the position of the pen can be made proportional to the magnitude of the input signal. Such type of recorders using a closed loop servo arrangement can be made extremely accurate and are generally designed to have large excursions of the recording element, for example, of the order of 10 inches. However, such oscillographs, because of their high inertia and slow response, can only be used on D.-C. signals or quasi-static type of information in which the maximum speed of the response is of the order of a fraction of a cycle per second.

In the open loop type of recorder a restoring force, such as a spring, centers the indicator. A deflecting force is produced in proportion to the signal being measured which deflects the indicator in opposition to the restoring force. There is no sensing means for determining the position of the indicator and the accuracy depends solely on how accurate the deflection, as a balance between the deflecting force and the restoring force, can be made. The open loop system, therefore, is considerably less accurate than the closed loop system, but it has the advantage that the moving element can be made considerably lighter and therefore the inertia of the moving system can be reduced to permit fairly accurate operation at much higher deflection rates than the closed loop systems heretofore employed.

The present invention is an improvement over prior art recording oscillographs in that it combines the advantages of the two types of systems. Thus, the present invention provides a recording oscillograph which has the inherent accuracy of a closed loop servo type of recording system and yet achieves dynamic performance which has heretofore only been possible with the open loop system of recorder. This is accomplished by utilizing a servo motor in a closed loop system having a very low mass in relation to the available accelerating force on the moving element of the servo motor.

In brief, the oscillograph comprises an in-line electric motor means including a magnetic field means defining an elongated gap, the magnetic field means producing magnetic flux across the gap. The motor means further includes a conductive wire element positioned in the gap and movable lengthwise of the elongated gap, whereby the motor means produces linear motion of the movable element in response to a current passing through the conductive element. A slide wire extends along the length of the gap and a contact element driven by the movable element of the motor means is used to develop a voltage indicative of the position of the movable element along the slide wire. Means is provided for producing an error signal indicative of the difference between an input voltage to be measured and the voltage derived from the slide wire contact. A current is passed through the conductive wire element of the motor means in response to this error signal, whereby a force is produced on the moving element to position it along the slide wire in a direction to reduce the error signal to zero. Suitable means, such as a recording pen or stylus, is moved by the moving element of the electric motor across the surface of a strip of recording paper to record the movement of the moving element of the motor.

For a better understanding of the invention reference should be had to the accompanying drawing, wherein:

Fig. 2 is a top elevational view partially in section of the recorder; and

Figure 1:
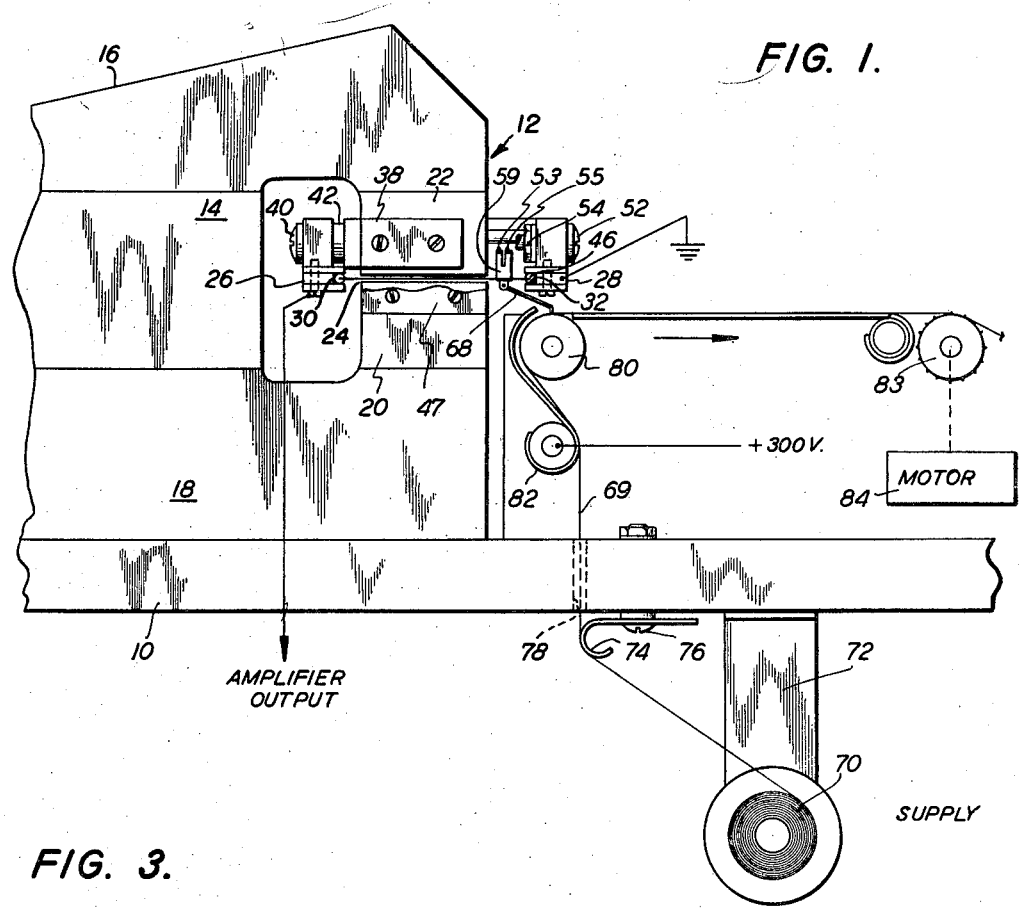
Fig. 1 is a side elevational view of the recorder.

Referring to the embodiment of the invention as illustrated in the drawings, the numeral 10 indicates generally the frame of the recorder on which is mounted an in-line type D.-C. motor indicated generally at 12. The motor consists of a permanent magnet field comprising a block of magnetic material 14, such as Alnico, and pole pieces 16 and 18 of high permeability soft iron or steel. The pole faces are formed by a pair of separate parallel blocks 20 and 22 forming the north and south poles respectively of the magnetic field across a small elongated gap 24 between the pole faces.

Extending longitudinally along either side of the gap are a pair of tracks 26 and 28. Each track includes a channel-shaped groove, such as indicated at 30 and 32 respectively. The grooves can be made, for example, by forming the tracks from three laminated strips, the center strip being smaller in width, whereby the two outer strips project beyond the edge of the center strip forming the longitudinal grooves. The track 28 is supported from the pole face 22 by means of screws 34 positioned along the track and passing through spacer elements 36 which position the track in spaced parallel relationship to the pole face member 22.

The track 26 is held in position by a pair of brackets, such as indicated at 38, which are secured to the ends of the pole face member 22. The track is secured to the brackets 38 by means of screws 40 which pass through fibre insulators and spacers 42, whereby the track is electrically insulated from the rest of the motor.

Slidably positioned in the grooves 30 and 32 of the tracks 26 and 28 respectively, is the moving element of the motor as indicated generally at 44. The moving element 44 is formed in the shape of the letter H out of a thin sheet of aluminum, the two sides of the H-member being aligned with the tracks, and the cross bar member of the H-shaped moving element extending through the magnetic gap 24. Sapphires or similar hard smooth wearing elements 46 are secured to the moving element at the edges of the H-shaped element to engage the grooves 32 and thereby provide a sliding support for the moving element 44 with a minimum of friction. A stop 47 is secured at each end of the pole element 20 and extends across the end of the gap 24 to stop the moving element 44.

In order to pass a current through the moving element 44 and thereby provide an accelerating force on the moving element of the motor, spring fingers 48 and 50 are soldered or otherwise secured to tabs 51 formed as part of the moving element 44, the spring fingers 48 and 50 slidably engaging the tracks 26 and 28 respectively.

From the description thus far, it will be seen that when a potential difference is applied between the tracks 26 and 28 a current will be caused to flow through the moving element 44. Since a magnetic field extends in the vertical direction in the gap and the current passes transversely through the gap, by virtue of the well-known "left-hand rule" for D.-C. motors, an accelerating force is produced in a direction mutually perpendicular to the direction of current flow and the direction of the magnetic flux, i.e., in a direction parallel to the tracks along the longitudinal extent of the gap. Depending upon the polarity of the applied potential between the tracks 26 and 28, the moving element 44 can be caused to move in one direction or the other along the extent of the tracks.

In order to utilize the in-line D.-C. motor above described as part of a recording oscillograph, a pair of parallel resistance wires 53 and 55 are stretched along the inner edge of the track 28. These resistance wires are supported by screws, such as indicated at 52, which are secured in position by means of nuts 54, the screws 52 and nuts 54 being arranged to clamp the track member 28 by means of fibre washers 56 and 58, which act to electrically insulate the resistance wires from the track.

The two resistance wires are contacted by a pair of spring fingers 59 secured to the moving element 44. The spring fingers 59 are suitably insulated from the moving element 44, but function to provide a short circuit at the point of contact between the two resistance wires. The resistance wires in combination with the short circuiting contact fingers 59 serve as a potentiometric sensing means which is utilized in the control circuit, as hereinafter described in connection with Fig. 3, to sense the position of the moving element 44.

Figure 3:
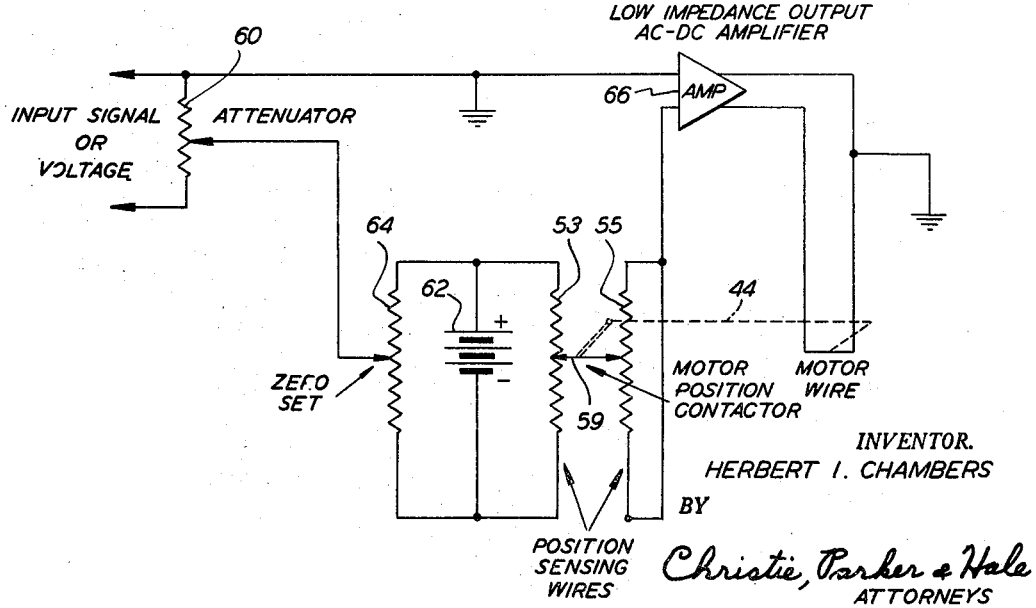
Fig. 3 is a schematic diagram of the electrical circuit of the recorder.

Referring to Fig. 3 in detail, the input signal to be measured is applied across a potentiometer type attenuator 60 from which an attenuated version of the input signal is derived. The input voltage derived from the attenuator 60 is balanced against a voltage derived from the slide wires in the following manner. The slide wire 53 is connected across a potential source 62 whereby a voltage is derived at the contact fingers 59 which is proportional to the position of the contact fingers 59 (and hence the position of the moving element 44 along the extent of the slide wire). Zero setting is provided by a second potentiometer 64 connected across the potential source 62, the sliding contact of which is directly connected to the input signal derived from the sliding contact of the attenuator 60. By means of the zero setting potentiometer 64, it will be seen that the point along the slide wire 53 at which a zero voltage is provided at the sliding contact fingers 59 with reference to the sliding contact of attenuator 60, may be adjusted.

If the voltage between the sliding contact of the potentiometer 64 and the sliding contact fingers 59 along the slide wire 53 is different than the voltage derived at the sliding contact to input attenuator 60, a net voltage is applied to the input of an amplifier 66. It will be noted that the contact finger 59 along the slide wire 53 is connected to the amplifier 66 through the second slide wire 55. The purpose of the second slide wire is to provide means for cancelling out noise which is generated by the contact potential between the slide wires and the contact fingers 59, known as the Tribo noise effect. The double potentiometer technique of cancelling out noise due to the Tribo effect is a well known technique and is not part of the present invention.

The output of the amplifier 66 is connected across the two tracks 26 and 28 so as to pass a driving current through the moving element 44. Since the moving element represents a very low impedance load, an amplifier must be provided having a low output impedance. Push-pull transistor circuits have been developed which can be used to drive very low impedance loads without transformer coupling, so that they can be used where it is required to amplify both D.-C. and audio A.-C. signals.

One suitable output power amplifier is described in the article "Symmetrical Properties of Transistors and Their Applications" by George C. Sziklai, Proceedings of the I.R.E., June 1953, pages 717–724. The amplifier 66 further includes voltage amplification ahead of the power output stage, the voltage amplification being derived by any suitable commercially available A.-C., D.-C. voltage amplifier capable of large voltage gains.

The circuit of Fig. 3 is arranged so that current passing through the moving element of the motor tends to move the moving element in a direction to reduce to zero the difference signal appearing at the input of the amplifier 66. If the magnitude of the input signal applied to the input attenuator 60 changes, a net signal results at the input of the amplifier 66 which accelerates the moving element 44 of the motor, causing the shorting contact fingers 59 to move along the slide wire 53 to a position where the net signal applied to the amplifier 66 is restored to zero, at which time the moving element 44 comes to rest. Thus, it will be seen that the position of the moving element 44 can be made proportional to the magnitude of the input signal applied to the attenuator 60.

In order to record the excursions of the moving element 44 in response to variations in the input signal applied to the attenuator 60, the moving element is provided with a tracing member or stylus 68. The stylus 68 rides against a sheet of special sensitized recording material 69, preferably of a type sensitive to an electrical current, reeled off of a supply roll, indicated generally at 70, rotatably supported from the frame 10 by suitable brackets 72. The recording material 69 is brought up over a rounded guiding member 74 secured to the frame, as by means of bolts indicated at 76, then through a slot 78 in the frame 10 and over a rotating mandril 80. Before passing over the mandril 80, the recording material 69 has its sensitive surface passing over a wiper contact, such as indicated at 82, which is maintained at a 300 volt potential. Thus, a rather large voltage drop is experienced at the point where the stylus 68 contacts the sensitive surface of the paper, since the stylus 68 is substantially at ground potential. As a result, a trace is produced on the electro-sensitive surface of the recording material by the stylus 68 as it is moved with the moving member 44 of the recording motor.

The recording strip is moved by a rotating mandril 83 driven by suitable motor means, such as indicated at 84. The mandril 83 is provided preferably with sprocket teeth which engage the recording material along the edges thereof to provide positive drive engagement between the mandril 83 and the recording material 69. The motor means may include a gear box for setting different speeds of the recording strip.

From the above description it will be recognized that an improved recording oscillograph is provided of the closed loop follow-up servo type. It has all the accuracy inherent in such type of servo recorder. Various servo techniques can be utilized if desired to improve the dynamic characteristics of the system, such as introducing a rate signal in the servo loop and/or introducing an acceleration signal. Refinements of this type to improve the servo loop performance are well known and need not be considered here in detail.

The present invention provides a recorder having greatly improved response time and therefore is capable of recording signals which vary at a rate more than ten times as fast as could heretofore be measured by known closed loop type recorders. This marked increase in performance is achieved by the unique motor having a very low mass moving element that moves in a straight line along guides rather than being rotated as in conventional servo motors.

What is claimed is:

1. Apparatus for producing a linear displacement in response to variations in magnitude of an input signal as a function of time comprising a field magnet having a pair of pole pieces defining an elongated magnetic gap, a pair of tracks positioned on either side of the gap and extending parallel to the length of the gap, a moving element guided by the tracks and including a single current conductor extending through the gap, means for producing a signal indicative of the position of the moving element including a slide-wire positioned along the extent of travel of the moving element, a contact carried by the moving element in sliding engagement with the slide-wire and means for applying a voltage across the slide-wire, means for deriving a signal proportional to the difference in magnitude of the input voltage and the voltage derived from said contact across a portion of the slide-wire, and means for passing a current through the conductor of the moving element having an instantaneous magnitude and polarity determined by said difference signal.

2. Apparatus for producing a linear displacement in response to variations in magnitude of an input signal as a function of time comprising a field magnet having a pair of pole pieces defining an elongated gap, a pair of tracks positioned on either side of the gap and extending parallel to the length of the gap, a moving element guided by the tracks and including a single current conductor extending through the gap, means for producing a signal indicative of the position of the moving element, means for deriving a signal proportional to the difference in magnitude of the input signal and the signal indicative of the position of the moving element, and means for passing a current through the conductor of the moving element having an instantaneous magnitude and polarity determined by said difference signal.

3. An oscillograph comprising magnetic means including a pair of elongated magnetic poles defining an elongated magnetic gap, an H-shaped moving element of conductive material having two parallel side portions and a central cross portion, guide means for supporting the moving element, the two parallel side portions slidably engaging the guide means on either side of the gap with the central cross portion of the moving element extending through the gap, sensing means including a slide-wire extending adjacent to and lengthwise of the elongated magnetic gap and contact means movable with the supporting means in contact with the slide-wire, means for deriving a voltage from the slide-wire contact carried by the supporting means, means for deriving an error signal indicative of the difference between an input signal and the voltage derived from the slide-wire contact, and means for passing a current through the central portion of the H-shaped element in response to said error signal, whereby a force is produced to position the moving element along the slide-wire so as to reduce the error signal to zero and restore the current through the central portion of the moving element to zero.

4. An oscillograph comprising magnetic means including an elongated magnetic gap, a single current conductor extending transversely through the gap, movable means supporting the conductive member in the gap, the supporting means being movable lengthwise of the elongated gap, sensing means extending adjacent to and lengthwise of the elongated magnetic gap for producing a signal indicative of the position along the gap of the conductor, means for deriving an error signal indicative of the difference between an input signal and the signal derived from the sensing means, and means for passing a current through said conductor in response to said error signal, whereby a force is produced in the movable supporting means to position the movable member so as to reduce the error signal to zero and restore the current through the conductor to zero.

5. Electrical apparatus for producing linearized movement comprising magnetic means including a pair of elongated and closely spaced magnetic poles defining an elongated magnetic gap across which magnetic flux is produced, an H-shaped moving element of conductive material having two parallel side portions and a central transverse portion, guide means for supporting the moving element, the two parallel side portions slidably engaging the guide means on either side of the gap with the central portion of the moving element extending transversely through the gap, and means for applying a potential between the side portions of the moving element to provide a flow of current through the central portion whereby a force is produced for moving said movable element along the longitudinal extent of the magnetic gap.

References Cited in the file of this patent

UNITED STATES PATENTS

| | | |
|---|---|---|
| 2,522,240 | Sias | Sept. 12, 1950 |
| 2,581,133 | Nieman | Jan. 1, 1952 |
| 2,606,092 | Rich | Aug. 5, 1952 |